(12) United States Patent
Dagan et al.

(10) Patent No.: US 7,412,057 B2
(45) Date of Patent: Aug. 12, 2008

(54) FAST-SOFTWARE-IMPLEMENTED PSEUDO-RANDOM CODE GENERATOR

(75) Inventors: Amit Dagan, Shimshit (IL); Orly Abramovich, Netanya (IL)

(73) Assignee: Intel Corporation, Santa Clara, CA (US)

( * ) Notice: Subject to any disclaimer, the term of this patent is extended or adjusted under 35 U.S.C. 154(b) by 1009 days.

(21) Appl. No.: 10/158,002

(22) Filed: May 31, 2002

(65) Prior Publication Data

US 2003/0223582 A1    Dec. 4, 2003

(51) Int. Cl.
*H04L 9/22* (2006.01)
*G06F 1/03* (2006.01)

(52) U.S. Cl. .................................. 380/268; 708/252
(58) Field of Classification Search ............... 380/210; 708/252

See application file for complete search history.

(56) References Cited

U.S. PATENT DOCUMENTS 5,946,473 A * 8/1999 Lotspiech et al. .............. 703/15
6,069,954 A * 5/2000 Moreau ....................... 380/28

OTHER PUBLICATIONS

Supplement to IEEE Standard for Information Technology—Telecommunications and information exchange between systems—Local and metropolitan area networks—Specific requirements—Part 11: Wireless LAN Medium Access Control (MAC) and Physical Layer (PHY) specifications: High-speed Physical layer in the 5 GHZ Band, Sponsor: LAN/MAN Standards Committee of the IEEE Computer Society, Approved Sep. 16, 1999, IEEE-SA Standards Board, ISBN 0-7381-1809-5 SH94787, p. 16.

Specification vol. 1, Specification of the Bluetooth System, Wireless Connections Made Easy, v1.0 B, Dec. 1, 1999, Part B, Baseband Specification, table of contents for Part B, p. 79 A compact disc storing a complete copy of this reference in PDF format is attached.

* cited by examiner

*Primary Examiner*—Emmanuel L. Moise
*Assistant Examiner*—David J. Pearson
(74) *Attorney, Agent, or Firm*—Kenyon & Kenyon LLP

(57) ABSTRACT

Embodiments of the present invention provide a fast, software-implemented data scrambling system for data communications. For pseudo-random codes that are periodic within a predetermined number of bits, a memory array may be populated with segments of the code, one entry in the array starting at a unique bit position within the code. During data scrambling, a seed code may be used to identify a first entry from the array that should be used for scrambling. Thereafter, subsequent segments may be retrieved by traversing the array in a regular fashion. By calculating the code before use and by populating the array prior to processing of any source data, the system is very fast.

46 Claims, 4 Drawing Sheets

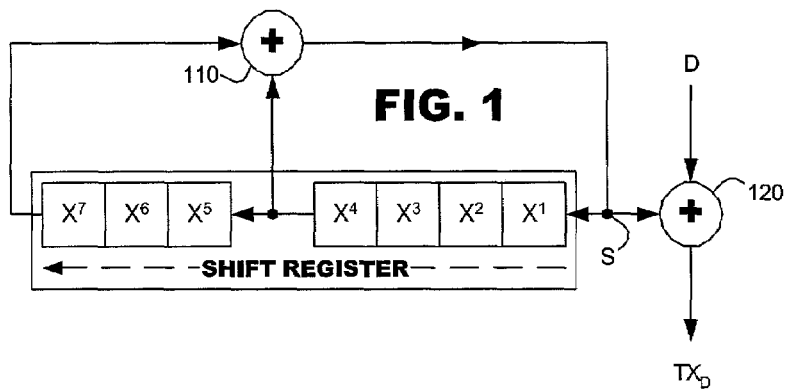
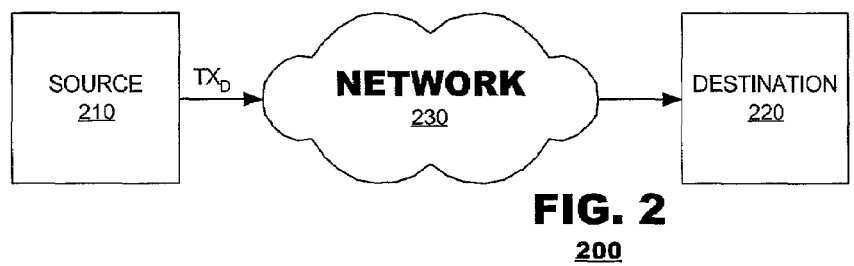
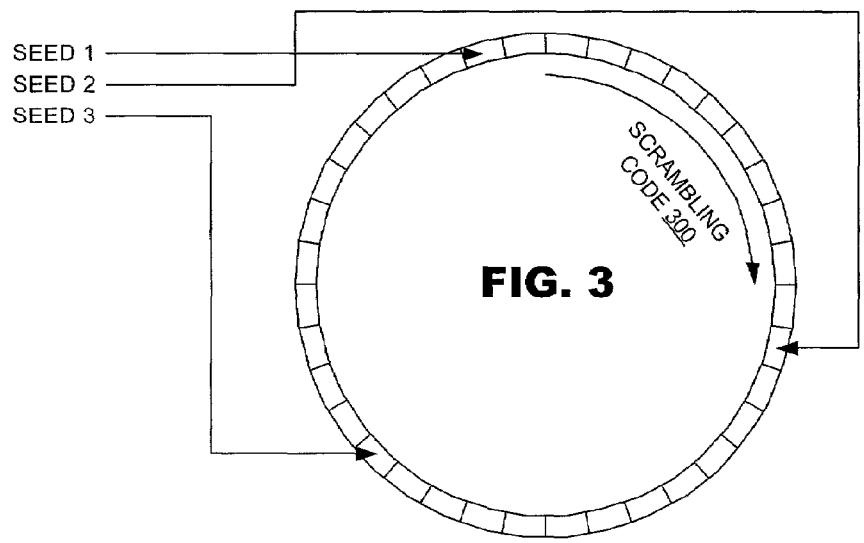

400

500

600

700

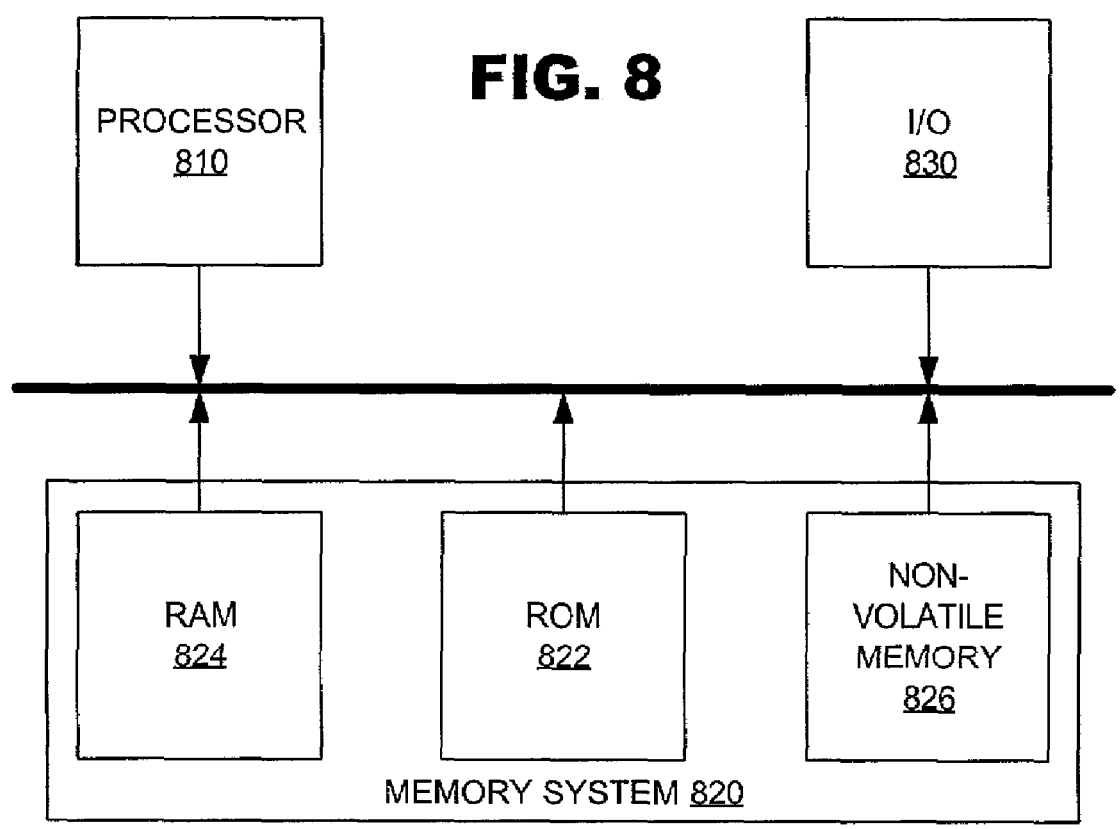

FAST-SOFTWARE-IMPLEMENTED PSEUDO-RANDOM CODE GENERATOR

BACKGROUND

The present invention relates to software implementations of pseudo-random codes used in data communications.

Pseudo-random codes are known for data communication. The IEEE 802.11a standard, for example, defines a communication protocol for wireless LANs that include "scrambler" and "pilot insertion" codes. See, IEEE std. 802.11a-1999 (Dec. 30, 1999). Other communication protocols define other pseudo-random codes. For example, the Bluetooth specification. v. 1.0 B (Dec. 1, 1999) defines a "whitening" code in the context of another wireless communication protocol. Various code division multiple access standards use pseudo random codes as pilot signals and as spreading signals. Other communication protocols, of course, may define other pseudo-random codes to be used for other purposes. Although implementations may vary, scrambling codes typically serve to reduce redundancy in transmitted data and also to reduce DC bias that might exist in the transmitted data. Reducing DC bias makes it easier to capture the transmitted data at a receiver.

FIG. 1 is a block diagram illustrating operation of a conventional scrambler in the context of the IEEE 802.11a standard. Typically, the scrambler includes a Linear Feedback Shift Register (LFSR) 100 having a predetermined number of bit positions $X^1$-$X^7$. The LFSR is initialized with a "seed" code and thereafter, on each cycle of a driving clock (not shown), the LFSR shifts the stored code a single bit position to the left. A new bit value S is stored in the $X^1$ position representing an exclusive-or (XOR) of data in positions $X^4$ and $X^7$ (block 110). A bit of transmitted data D is XORed with the new data S (block 120), yielding scrambled data $TX_D$. The result of the XOR will be transmitted to a receiver. In this example, a pseudo-random code is built from the values S generated over time.

FIG. 2 illustrates a simple communication link. In FIG. 2, scrambled data $TX_D$ may be transmitted from a source 210 to a destination 220. At the destination, the same pseudo-random code S is applied to the scrambled data $TX_D$ by another XOR operation to recover the original source data D (labeled D' herein). If some receiver, either the destination or some unauthorized recipient of the data, attempted to recover the source data using an incorrect pseudo-random code or the correct code using an incorrect seed, the resulting data D' would not match the source data D.

Table 1 is a truth table illustrating exemplary scrambling bits at the source ($S_{SRC}$) and the destination ($S_{DEST}$). As shown in the table, whenever $S_{SRC} \neq S_{DEST}$, the recovered data D' will not be the same of as the original source data D. Thus, a recipient that uses an incorrect pseudo-random code, due to either an incorrect code generation scheme or an incorrect seed code, will not be able to recover the source data signal.

TABLE 1

| $S_{SRC}$ | D | $TX_D$ | $S_{DEST}$ | D' | D RECOVERED CORRECTLY? |
|---|---|---|---|---|---|
| 0 | 0 | 0 | 0 | 0 | Yes |
| 0 | 1 | 1 | 0 | 1 | Yes |
| 1 | 0 | 1 | 0 | 1 | No |
| 1 | 1 | 0 | 0 | 0 | No |
| 0 | 0 | 0 | 1 | 1 | No |
| 0 | 1 | 1 | 1 | 0 | No |
| 1 | 0 | 1 | 1 | 0 | Yes |
| 1 | 1 | 0 | 1 | 1 | Yes |

Conventionally, data scrambling for communication is performed by dedicated hardware circuits, using a dedicated LFSR circuit and XOR gates modeled after the system shown in FIG. 1. Thus, it is expected that pseudo-random codes and scrambled data will be generated iteratively using a driving clock source to control the circuit. Dedicated communication circuits typically are used to reduce communication latency. It would be possible to implement the scrambling processes in software, but the iterative processing that is used to generate the pseudo-random code would introduce severe latency problems in communication. Accordingly, for many applications, scrambling data by software is disfavored.

Although provision of dedicated circuits can achieve reduced latency, they can be disadvantageous because they are not flexible. Once a circuit is manufactured and deployed it cannot be updated to include processes that would be required, for example, to implement new standards or updates to existing standards. Accordingly the inventor foresees a need in the art for a software-implemented processing system that performs physical layer processing for communications, of which data scrambling is a part. Because software implementations typically are much slower than hardware circuits that perform the same processes, the inventor foresees a need in the art for a fast software implementation scrambling system, one that avoids the incremental, step-by-step generation of pseudo-random codes that occur in hardware systems.

Accordingly, there is a need in the art for a fast software-implemented scrambling algorithm for use in communications.

BRIEF DESCRIPTION OF THE DRAWINGS

FIG. 1 is a block diagram of a known scrambling circuit.

FIG. 2 illustrates a simple communication link.

FIG. 3 illustrates several properties of pseudo-random codes.

FIG. 8 is a block diagram of a computer platform suitable for use with embodiments of the present invention.

DETAILED DESCRIPTION

Embodiments of the present invention provide a software implementation for physical layer scrambling algorithms. The embodiments capitalize upon a recognition that the values S of the pseudo-random code are independent of the transmitted data. They depend only upon the structure of the scrambler circuit, in particular, the length of the LFSR, the LFSR bit positions from which the new pseudo-random code bits are to be generated ($X^4$ and $X^7$ in FIG. 1) and the seed code that is used to initialize the LFSR. Further, the code is only pseudo-random; it is cyclical having a period of $2^N-1$ bits. Thus, in the seven bit example of FIG. 1, the random code repeats itself after 127 ($2^7-1$) bits. Given an identical scrambling algorithm and two different seed codes, the pseudo-random codes generated therefrom will be identical but merely shifted with respect to each other. These properties of scrambling algorithms permit them to be implemented in software in a manner that avoids iterative generation of pseudo-random codes. Thus, the software implementations can be quite efficient.

FIG. 3 illustrates some of the properties of scrambling algorithms that are described above. A pseudo-random code 300 is illustrated as a periodic code. A given seed code, for example SEED1, determines a starting point in the periodic code. Different seed codes, for example SEED2 and SEED3. From the starting point, the bit pattern of the pseudo-random code is pre-determined. Thus, the different seed codes may be seen each as generating the same periodic pseudo-random code as every other seed code but at different starting points within that code. Each bit from the periodic code is XORed with a bit of source data to generate a scrambled data bit until the source data is exhausted. The scrambled data typically is processed further by other processes and transmitted.

These properties of pseudo-random codes are exploited by various embodiments of the present invention. According to an embodiment, the pseudo-random code may be generated prior to any attempt at transmission and stored in a memory array as a plurality of code segments. If the period of the code is K bits, then K different code segments may be stored in the array, each segment starting at a unique position within the periodic code. In the simplest embodiment, each entry i within the array may store a segment of the pseudo-random code beginning at the $i^{th}$ code position.

Figure 4:
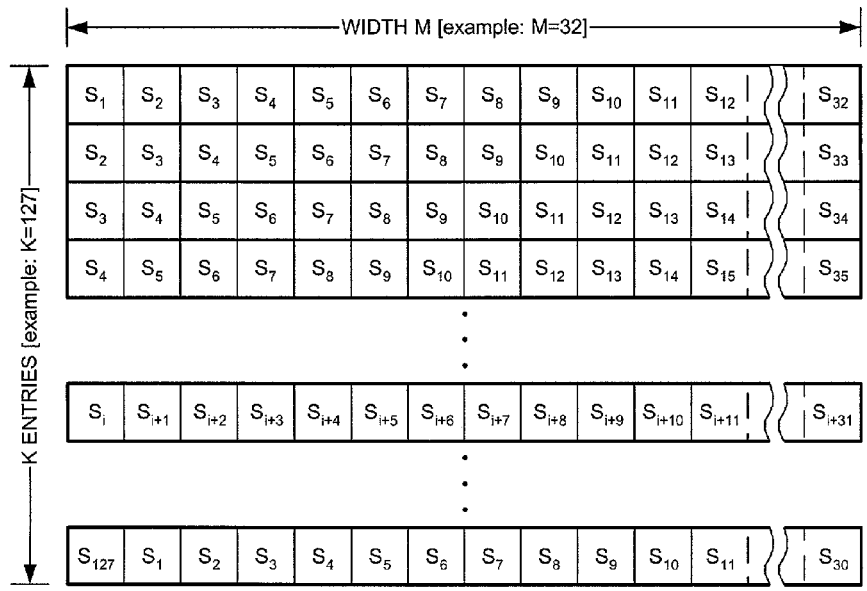
FIG. 4 illustrates an exemplary memory array according to an embodiment of the present invention.

FIG. 4 illustrates the structure of an exemplary memory array 400 according to an embodiment of the present invention. There, the array is populated by K entries, each having a width of M. Each of the K entries stores a segment of the pseudo-random code and each entry starts at a unique position within the periodic code. To simplify the presentation, FIG. 4 illustrates an example where a pseudo-random code is periodic over 127 bits and the width of each entry is shown as 32 bits. Thus each entry i ($1 \leq i \leq 127$) contains a segment of the pseudo-random code beginning at position $S_i$ and continuing through position $S_{i+M}$ ($S_{i+32}$ in the example of FIG. 4). Of course, the pseudo-random code is periodic and, therefore, in the $127^{th}$ entry and elsewhere, the $S_1$ bit follows the $S_{127}$ bit in the code segment.

Using the memory array of FIG. 4, a fast software-implemented scrambling algorithm is possible. Rather than calculate each bit of the pseudo-random code on some real-time basis, it is possible to store the pseudo-random code ahead of time. When it becomes necessary to scramble some source data stream, the pseudo-random code may be retrieved from the memory array in M sized data units. Scrambling, therefore, may become a software operation, where M-sized portions of the source data stream are scrambled using M-sized segments of the pseudo-random code.

Figure 5:
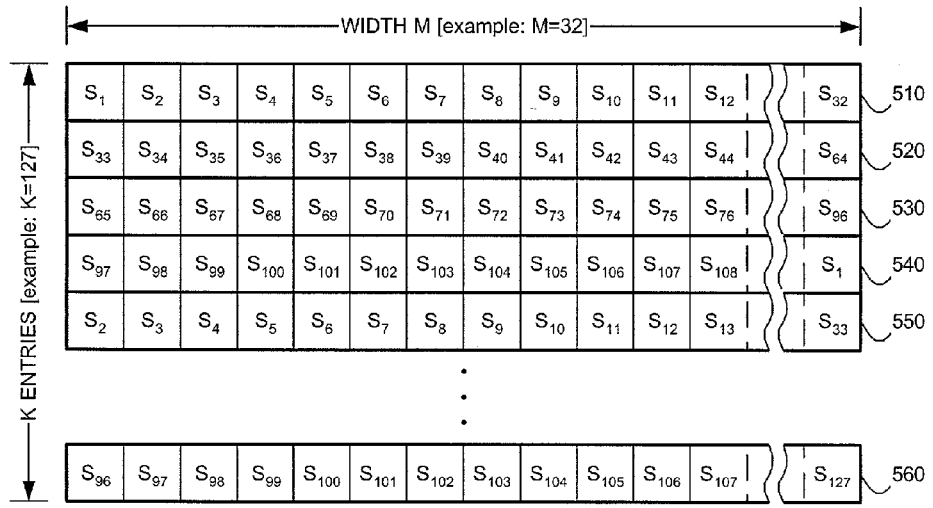
FIG. 5 illustrates another exemplary memory array according to an embodiment of the present invention.

FIG. 5 illustrates another memory array 500 according to an embodiment of the present invention. As in the prior embodiment, each entry may be populated by segments of the pseudo-random code, each segment having a predetermined width M. For a pseudo-random code that is periodic within K bits, there may be K different entries in the array. Each segment may start at a unique position within the periodic code.

In the embodiment of FIG. 5, code segments of adjacent entry positions may be adjacent in the pseudo-random code. Thus, in the example shown in FIG. 5, the first and second entries 510, 520 store segments extending respectively from positions $S_1$-$S_{32}$ and $S_{33}$-$S_{64}$. The third entry position 530 stores a segment that is continuous with the segment from the second entry (bits $S_{65}$-$S_{96}$). This pattern continues throughout the array. Eventually, an entry, such as entry 550, will "wrap" through the code; it will include both the last and first bit positions ($S_{127}$, $S_1$) of the pseudo-random code and possibly some others. Subsequent entries (not shown in FIG. 5), pick up the pseudo-random code where the prior entry left off.

In this example, any entry i should include a code segments extending from bit $S_{Beg}$ to $S_{End}$, where Beg and End are given as follows:

Beg=((i*M)+1) mod K, and

End=(M*(i+1)) mod K;

where M is the width of the array and K represents the period of the pseudo-random code.

Figure 6:
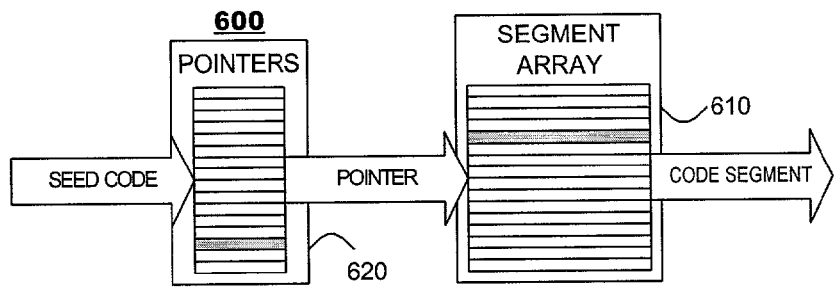
FIG. 6 illustrates a memory system for use with the memory arrays of the foregoing embodiments.

FIG. 6 illustrates a memory system 600 for use with the memory arrays of the foregoing embodiments. This system includes a memory array 610 of pseudo-random code segments as described above and a second memory array of seed pointers 620. As its name implies, the pointer array 620 includes pointers to entries of the segment array 610. Given an initial seed code, the seed code may be used as an index into the pointer array 620. A pointer may be read from the pointer array 620 and used to index the segment array 610. The indexed entry in the segment array 610 stores an initial code segment to be used for data scrambling. Thereafter, subsequent code segments may be retrieved from the segment array 610 using the stride lengths described above. Thus, array 610 need not be accused again after a first code segment is identified and retrieved from the second array 620.

Figure 7:
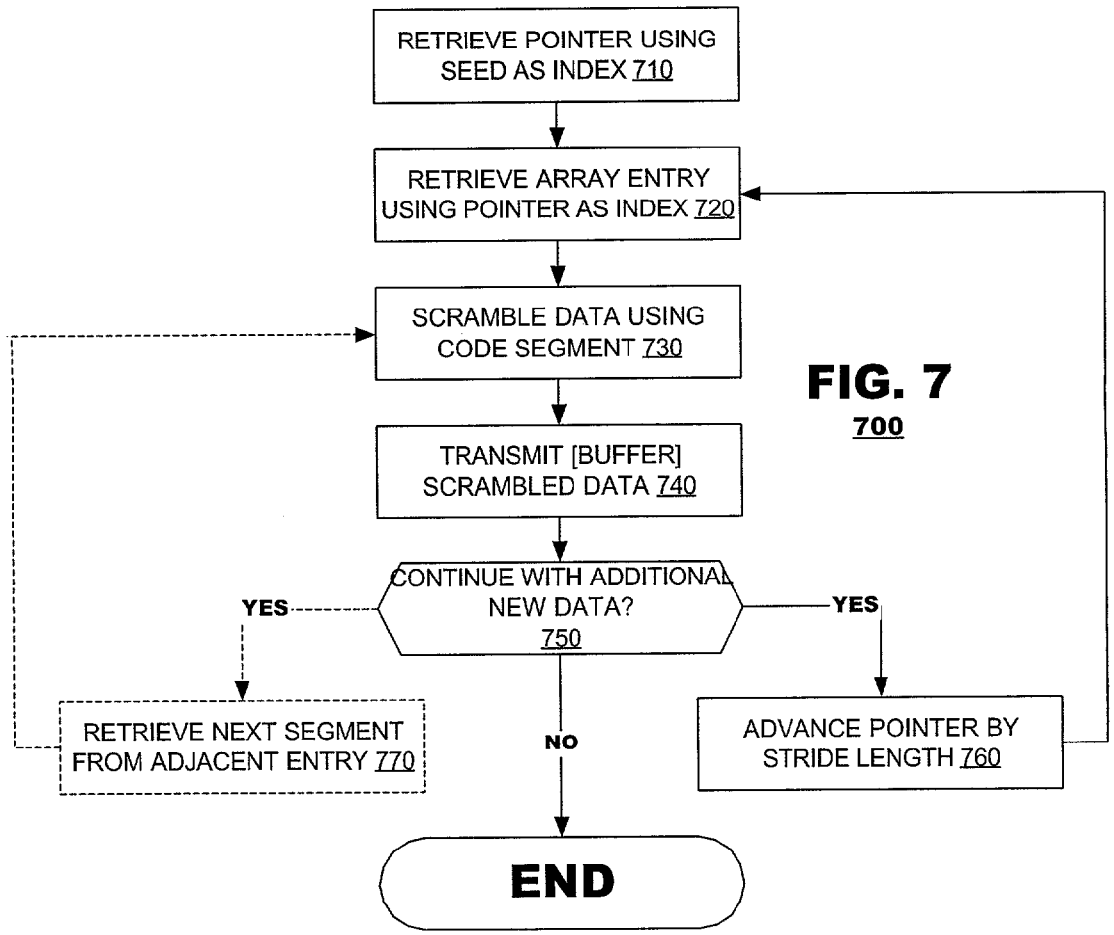
FIG. 7 illustrates a method for addressing a memory system of code segments according to an embodiment of the present invention.

FIG. 7 illustrates a method 700 for addressing a memory system of code segments according to an embodiment of the present invention. According to the method 700, a pointer may be retrieved from the pointer array using the seed as an index (block 710). Thereafter, the pointer itself may be used as an index into a segment array to retrieve an initial code segment for use in data scrambling (block 720). A segment of source data may be scrambled using the retrieved code segment (block 730) and the resultant scrambled data may be transmitted or buffered for transmission (block 740). Thereafter, if there exists additional source data to be scrambled (block 750), the method 700 may advance the pointer to a next array entry (block 760) and return to block 730. When used with an array such as that illustrated in FIG. 4, the method 700 may advance the pointer by the stride length M. When used with an array such as that illustrated in FIG. 5, the method 700 may advance the pointer to the next entry. In both embodiments, the pointer may wrap around to the beginning of the array if advancing it would cause it to extend past the last entry of the array. For example, advancement of the pointer may be implemented using a mod K arithmetic operation.

The foregoing embodiments provide a fast software-implemented system for generating a periodic code. These embodiments are expected to perform almost 30 times more effectively than software-implemented schemes that would generate the periodic code on a bit-by-bit basis, essentially replicating the hardware approach in software. Consider an example of the foregoing embodiments in the context of a 32 bit wide array. It would take one or two instructions to retrieve a 32 bit code segment and perform an XOR operation with a corresponding segment of source data. By contrast, it might require six to seven instructions to generate a single bit of the pseudo-random code and XOR it with a bit of source data.

Those six to seven instructions would have to be repeated 32 times to generate the same amount of scrambled data that could be generated from one entry in the array. Thus, the foregoing embodiments generate scrambled data almost 100 times (2 instructions vs. 6*32=192 instructions) more efficiently.

As noted, the foregoing embodiments may provide a software implemented system. As such, these embodiments may be represented by program instructions that are to be executed by a computer platform, such as a personal computer, server or other common platform. One such platform 800 is illustrated in the simplified block diagram of FIG. 8. There, the platform is shown as being populated by a processor 810, a memory system 820 and an input/output (I/O) unit 830. The processor 810 may be any of a plurality of conventional processing systems, including microprocessors, digital signal processors and field programmable logic arrays. In some applications, it may be advantageous to provide multiple processors (not shown) in the platform 800. The memory system 820 may include any combination of conventional memory circuits, including electrical, magnetic or optical memory systems. As shown in FIG. 8, the memory system may include read only memories 822, random access memories 824 and non-volatile storage 826. The memory system 820 would store program instructions and the memory arrays of the foregoing embodiments for use by the processor 810. The I/O unit 830 would permit communication with external devices, such as the communication network 230 (FIG. 2) and other components.

Several embodiments of the present invention are specifically illustrated and described herein. However, it will be appreciated that modifications and variations of the present invention are covered by the above teachings and within the purview of the appended claims without departing from the spirit and intended scope of the invention.

I claim:

1. A method for generating scrambled data using a periodic pseudo-random code, comprising:
   in response to a seed code, generating a pointer into a memory array, the array storing previously calculated segments of the pseudo-random code, wherein the content of each stored segment of the pseudo-random code is partially redundant to content of at least one other segment stored in the array; and
   iteratively:
      retrieving a multi-bit code segment from the memory array addressed by the pointer,
      scrambling a corresponding amount of source data using the retrieved code segment, and
      if the method is to continue through another iteration, advancing the pointer by a regular amount.

2. The method of claim 1, wherein each entry of the memory array stores a segment beginning at a unique position of the pseudo-random code.

3. The method of claim 1, wherein the advancing increments the pointer by a stride length equal to a width of the retrieved code segment.

4. The method of claim 1, wherein the advancing increments the pointer by one.

5. The method of claim 1, wherein the advancing is performed by a mod K arithmetic operation, where K represents a period of the pseudo-random code.

6. The method of claim 1, wherein the pointer is stored in a second array, the second array being indexed by the seed code.

7. The method of claim 1, wherein for a pseudo-random code that is periodic within K bits, the memory array has K entries.

8. The method of claim 1, wherein the pseudo-random code is defined by the IEEE 802.11a information exchange standard.

9. The method of claim 1, wherein the pseudo-random code is the pilot code defined by the IEEE 802.11a information exchange standard.

10. The method of claim 1, wherein the pseudo-random code is the whitening code defined by the Bluetooth wireless communication specification.

11. A data scrambling method, comprising:
    indexing a first array using a scrambling seed code to retrieve a pointer,
    iteratively:
       indexing a second array using the pointer to retrieve a multi-bit segment of a periodic pseudo-random code from a memory array storing multiple segments of the pseudo-random code, wherein the content of each stored segment of the pseudo-random code is partially redundant to content of at least one other segment stored in the array,
       scrambling a corresponding amount of source data using the pseudo-random code segment, and
       when there is more source data to scramble, advancing the pointer by a regular amount.

12. The method of claim 11, wherein the advancing increments the pointer by a stride length equal to a width of the retrieved code segment.

13. The method of claim 11, wherein the advancing increments the pointer by one.

14. The method of claim 11, wherein each entry i of the second array includes a segment of the code starting at position i and ending at position (i+M) mod K, where M represents a width of the entry and K represents a period of the pseudo-random code.

15. The method of claim 11, wherein each entry of the second array includes a segment of the code that is continuous with the segments of adjacent entry positions.

16. The method of claim 11, wherein each entry i of the second array includes a segment of the code starting at a position Beg=((i*M)+1)) mod K and ending at a position End=(M*(i+1)) mod K.

17. In a communication system, a scrambling device, comprising:
    a memory system, including an array having K multi-bit entries each to store a segment of a pseudo-random code that is periodic within K bits, the entries having a common width of M bits, and
    an exclusive-or processing system having inputs for a multi-bit segment of source data and a code segment from the array, each input having a width of M,
    wherein the memory system comprises a second array storing pointers into the first array, the second array being indexed by a seed code.

18. The system of claim 17, wherein each entry of the array stores a segment beginning at a unique position of the code.

19. The system of claim 17, wherein the pseudo-random code is defined by the IEEE 802.11a information exchange standard.

20. The system of claim 17, wherein the pseudo-random code is the pilot code defined by the IEEE 802.11a information exchange standard.

21. The system of claim 17, wherein the pseudo-random code is the whitening code defined by the Bluetooth wireless communication specification.

22. A secure communication method, comprising:
exchanging a seed code between a transmitter and a receiver,
by the transmitter, scrambling source data using a first pseudo-random code derived from the seed code and transmitting it to the receiver,
by the receiver, receiving the scrambled data and recovering source data therefrom using a second pseudo-random code derived from the seed code,
wherein the first and second pseudo-random codes are the same, and
wherein at least one of the transmitter and the receiver generate the pseudo-random code by a method comprising:
from the seed code, generating a pointer into a memory array, the array storing previously calculated segments of the pseudo-random code, each stored segment being partially redundant to content of at least one other stored segment; and
iteratively, retrieving a multi-bit code segment from the memory array addressed by the pointer, scrambling a corresponding amount of source data using the retrieval code segment and, unless the iterative process is to conclude, advancing the pointer.

23. The method of claim 22, wherein the advancing increments the pointer by a stride length equal to a width of the retrieved code segment.

24. The method of claim 22, wherein the advancing increments the pointer by one.

25. The method of claim 22, wherein each entry i of the second array includes a segment of the pseudo-random code starting at position i and ending at position (i+M) mod K, where M represents a width of the entry and K represents a period of the pseudo-random code.

26. The method of claim 22, wherein each entry of the second array includes a segment of the pseudo-random code that is continuous with the segments of adjacent entry positions.

27. A computer readable medium, storing program instructions that when executed, cause a processing circuit to:
generate a pointer into an array in response to a seed code, the array storing previously calculated segments of a pseudo-random code, each stored segment being partially redundant to content of at least one other stored segment; and
iteratively:
retrieve a multi-bit code segment from the memory array addressed by the pointer,
scramble a corresponding amount of source data, and if another iteration is to occur, advance the pointer by a regular amount.

28. The computer readable medium of claim 27, wherein the memory further stores the array.

29. The computer readable medium of claim 27, wherein each entry of the array stores a segment beginning at a unique position of the pseudo-random code.

30. The computer readable medium of claim 27, wherein the pointer is advanced by a stride length equal to a width of the retrieved code segment.

31. The computer readable medium of claim 27, wherein the pointer is advanced by one.

32. The computer readable medium of claim 27, wherein the pointer is stored in a second array, the second array being indexed by the seed code.

33. The computer readable medium of claim 32, wherein the second array is stored on the medium.

34. The computer readable medium of claim 27, wherein, for a pseudo-random code that is periodic within K bits, the array has K entries.

35. The computer readable medium of claim 27, wherein the pseudo-random code is defined by the IEEE 802.11a information exchange standard.

36. The computer readable medium of claim 27, wherein the pseudo-random code is the pilot code defined by the IEEE 802.11a information exchange standard.

37. The computer readable medium of claim 27, wherein the pseudo-random code is the whitening code defined by the Bluetooth wireless communication specification.

38. A method of generating a periodic code, comprising:
given a seed code, generating a pointer into an array, the array having K entries, each entry storing a previously-generated multi-bit segment of the code having a width M, the segment of each entry starting at a unique position within the periodic code and being partially redundant to content of at least one other stored segment; and
iteratively, until a final iteration is reached:
retrieving the segment identified by the pointer, and
advancing the pointer;
wherein K represents the period of the code.

39. The method of claim 38, wherein the advancing increments the pointer by 1.

40. The method of claim 38, wherein the advancing increments the pointer by M.

41. The method of claim 38, wherein the advancing is a mod K arithmetic operation.

42. The method of claim 38, wherein the segment in each entry i starts at a position i of the code.

43. The method of claim 38, wherein the segment in each entry i starts at a position ((i*M)+1) mod K.

44. The method of claim 38, wherein the generating comprises using a seed code as an index to a second array, the array populated by a plurality of pointers into the array of code segments.

45. A method for generating scrambled data using a periodic pseudo-random code, comprising:
determining a location in a static memory array of previously calculated segments of the pseudo-random code, each segment being partially redundant to content of at least one other segment; and
iteratively:
retrieving a multi-bit code segment from the location in the static memory array, scrambling a corresponding amount of source data using the retrieved code segment, and if the method is to continue through another iteration, modifying the location by a regular amount.

46. The method of claim 1, wherein, for a pseudo-random code that is periodic in K bits, the memory array has K entries, each entry to store a segment of the pseudo-random code beginning at a unique position of the pseudo-random code.

* * * * *

UNITED STATES PATENT AND TRADEMARK OFFICE
CERTIFICATE OF CORRECTION

| | | |
|---|---|---|
| PATENT NO. | : 7,412,057 B2 | Page 1 of 1 |
| APPLICATION NO. | : 10/158002 | |
| DATED | : August 12, 2008 | |
| INVENTOR(S) | : Amit Dagan et al. | |

It is certified that error appears in the above-identified patent and that said Letters Patent is hereby corrected as shown below:

Title Page, Item (54) and Column 1, line 1, "FAST-SOFTWARE" should be --FAST SOFTWARE--

Signed and Sealed this

Seventeenth Day of November, 2009

David J. Kappos
*Director of the United States Patent and Trademark Office*